United States Patent
Hamasaki et al.

[11] Patent Number: 5,732,190
[45] Date of Patent: Mar. 24, 1998

[54] NUMBER-OF RECOGNITION CANDIDATES DETERMINING SYSTEM IN SPEECH RECOGNIZING DEVICE

[75] Inventors: Ryosuke Hamasaki; Kyung-Ho Loken-Kim, both of Kawasaki, Japan

[73] Assignee: Fujitsu Limited, Kawasaki, Japan

[21] Appl. No.: 359,843

[22] Filed: Dec. 20, 1994

Related U.S. Application Data

[63] Continuation of Ser. No. 922,783, Jul. 31, 1992, abandoned.

[30] Foreign Application Priority Data

Aug. 1, 1991 [JP] Japan ............................... 3-193261

[51] Int. Cl.$^6$ ............................................ G10L 5/06
[52] U.S. Cl. ........................................ 395/2.42; 395/2.35
[58] Field of Search ....................... 381/43, 46; 395/2.42, 395/2.35

[56] References Cited

U.S. PATENT DOCUMENTS 4,720,802  1/1988  Damoulakis et al. .
4,829,578  5/1989  Roberts ............................ 381/46
4,860,358  8/1989  Rabiner .
5,201,004  4/1993  Fujiwara et al. .................. 381/46

FOREIGN PATENT DOCUMENTS 0487307    5/1992  European Pat. Off. ........ G10L 5/06
A-0 487 307  5/1992  European Pat. Off. .
A-3 819 178  12/1988  Germany .

*Primary Examiner*—Allen R. MacDonald
*Assistant Examiner*—Vijay B. Chawan
*Attorney, Agent, or Firm*—Staas & Halsey

[57] ABSTRACT

A number-of-recognition candidates determining system in a speech recognition device comprises an SN ratio calculator for calculating an SN ratio of an inputted speech to the environmental noise, and a number-of-recognition candidates controller for controlling the number of the recognition candidates according to the value of the SN ratio calculated by the SN ratio calculator. The number of recognition candidates varies according to the value of the SN ratio.

9 Claims, 12 Drawing Sheets

NUMBER-OF RECOGNITION CANDIDATES DETERMINING SYSTEM IN SPEECH RECOGNIZING DEVICE

This application is a continuation of application Ser. No. 07/922,783, filed Jul. 31, 1992, now abandoned.

BACKGROUND OF THE INVENTION

1. Field of the Invention

The present invention relates to a speech recognition device for recognizing a vocally inputted instruction as data and more particularly, to a number-of-recognition candidates determing system in the speech recognizing device for outputting a plurality of recognition candidates by calculating a similarity between a plurality of a preliminarily registered speeches and an inputted speech.

2. Description of the Related Art

Recently, technologies for recognizing speech using a computer and for vocally inputting instructions and data have been popularly utilized in many fields of industry. The technologies include voice controlled word processors and automatically operated machines, etc.

FIG. 1 is a general view of a speech recognizer, and a brief explanation about its operation is given below by referring to FIG. 1.

Inputted speech data are analyzed by an analyzer 1, and the analysis result and the feature vectors of each word stored in a dictionary 2 are matched by a matching score calculator 3 to obtain a matceing score for "similarity". "Distance" is also used instead of "similarity". A small distance means a high similarity. A recognition candidate determiner 4 outputs a recognition word string in the order from the word having the highest similarity according to a predetermined number of word candidates. Assuming that the number of candidates is "10", ten highest similarity words are outputted as recognition candidates.

The recognition rate of the above described speech recognition device greatly depends on the value of an SN ratio, that is, a ratio of an inputted speech to an environmental noise. For example, a speech recognition device inputs different SN ratios depending on its location and the time because an environmental noise changes with time of day.

FIG. 2 is a graph indicating the change in the recognition rate of each SN ratio depending on the number of candidates to be recognized. In FIG. 2, the recognition rate at the SN ratio of 50 dB is represented by the solid line, that at the SN ratio of 30 dB is represented by a broken line, and that at the SN ratio of 10 dB is represented by a dashed line. In FIG. 2, if the number of candidates to be recognized is determined to be "10", the SN ratio of 50 dB yields the recognition rate of 95%, that of 30 dB yields the rate of 88%, and that of 10 dB yields the rate of 82%. Thus, the higher SN ratio indicating a lower noise yield the higher the recognition rate.

As described above, an SN ratio of a great value allows a high percentage of recognition, and vice versa. That is, a word having the highest similarity at an SN ratio of a small value can be ranked at a lower priority, for example, the fifteenth, if an SN ratio indicates a small value. In this case, the word is excluded from the candidates if the number of candidates to be recognized is set to 10.

This is caused by the fixed number of word candidates, for example, 10. In this case, ten highest order words are determined to be word candidates and the following words are determined to be excluded from the candidates. Therefore, a word to be reasonably defined as a candidate is often determined to be out of the range of candidates. Thus, conventional speech recognition devices yield different recognition rates greatly depending on an SN ratio which is changeable according to the state of its environment.

SUMMARY OF THE INVENTION

The present invention aims at calculating an SN ratio changeable by the state of the environment and improving a recognition rate by changing the number of word candidates depending on the change of an SN ratio.

The present invention is used in a speech recognition device for recognizing a speech, namely, a vocally inputted instruction and data, and utilizes a number-of-recognition candidates determining system in the speech recognition device for outputting a plurality of candidates to be recognized by calculating the similarity between a plurality of stored speeches and an inputted speech, and selecting as recognition candidates a plurality of words having higher similarity.

The present invention comprises an SN ratio calculator for calculating an SN ratio, that is, a ratio of a sound level to the environmental noise, and a number-of-candidates controller for controlling the number of word candidates to be recognized.

It further comprises an analyzer, a score calculator, a recognition candidate determiner, and a dictionary. The analyzer analyzes inputted speech, and the analysis result and the feature vectors of a word stored in the dictionary are matched by the score calculator to calculate a score for the "similarity".

A number-of-candidates control signal is outputted from the number-of-candidates controller to the recognition candidate determiner according to an SN ratio obtained by the SN ratio calculator. The recognition candidate determiner outputs a predetermined number of words having a higher priority according to their similarity as a recognition candidate word string. The number of word candidates to be recognized can be controlled corresponding to a given SN ratio. That is, at an SN ratio of a small value, the number of word candidates to be recognized is increased.

Such control prevents the problem that a word, which is ranked at a high priority at an SN ratio of a large value, may be assigned a low priority and is excluded from a candidate group. Thus, a word to be reasonably defined as a candidate can be prevented from being excluded from a candidate group, and can be processed as a word candidate, thereby improving a recognition rate.

BRIEF DESCRIPTION OF THE DRAWINGS

One of skill in the art can easily understand additional features and objects of this invention from the description of the preferred embodiments and some of the attached drawings. In the drawings.

DETAILED DESCRIPTION OF THE PREFERRED EMBODIMENT

Figure 1:
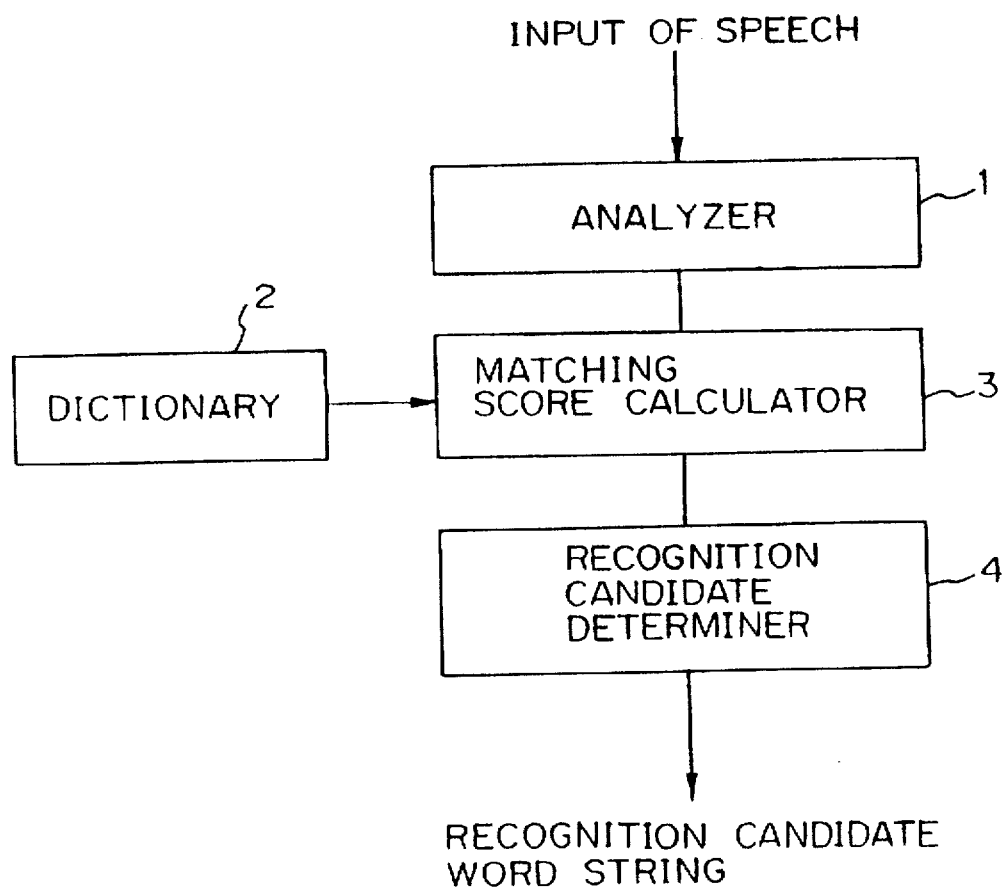
FIG. 1 shows the configuration of a conventional number-of-candidates determining system.
Figure 2:
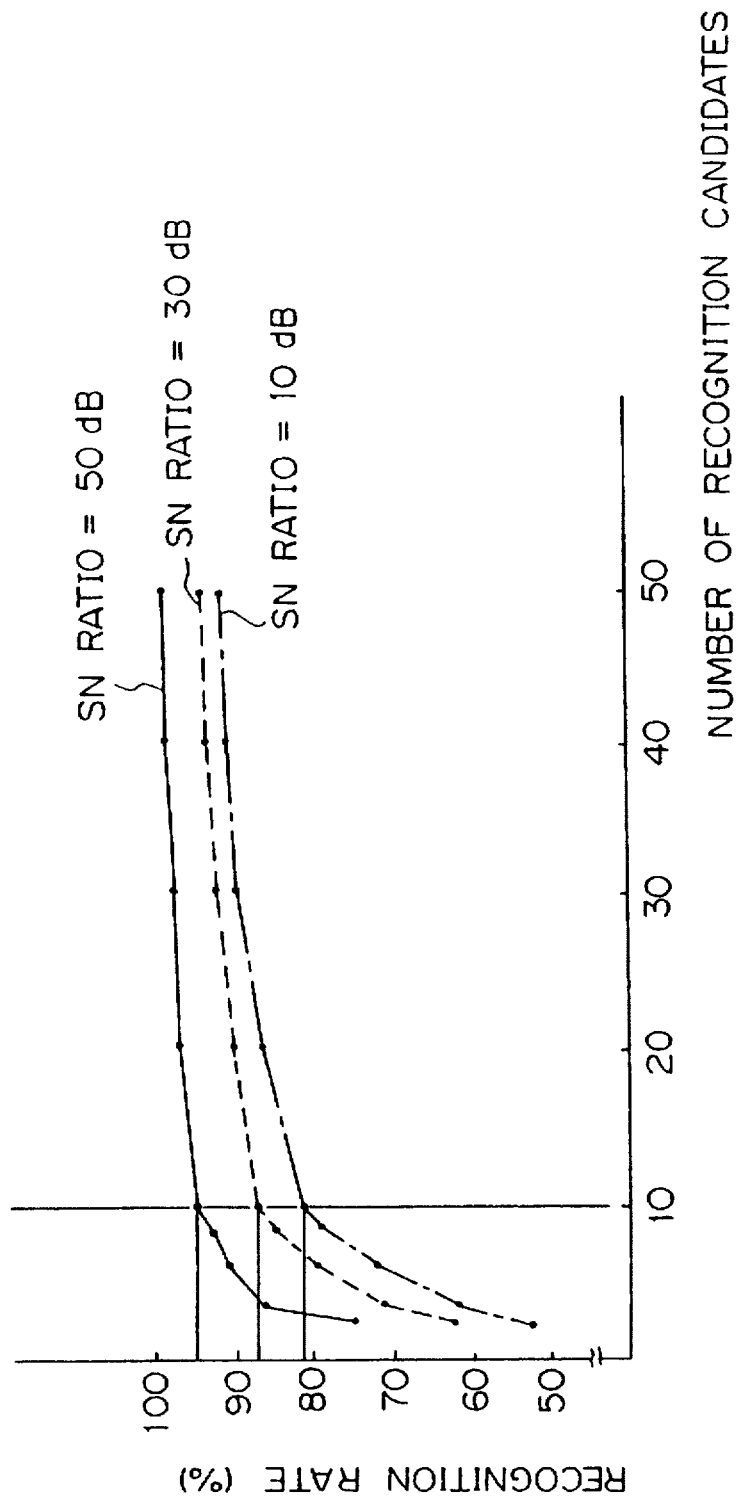
FIG. 2 shows the change in a recognition rate due to the change in an SN ratio when the number of candidates is fixed to a predetermined value in the conventional system.
Figure 3:
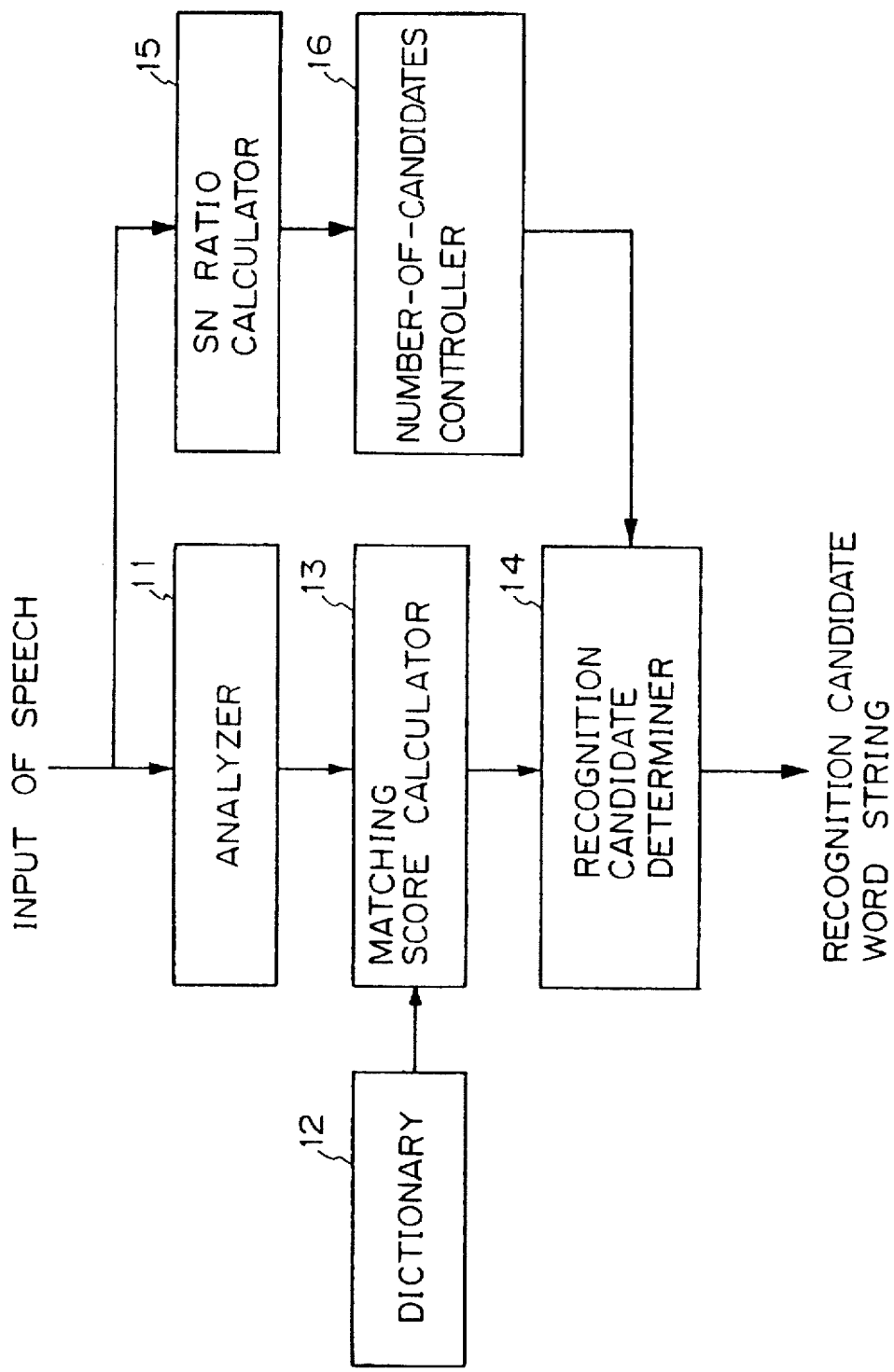
FIG. 3 is a block diagram for explaining the principle of the present invention.

FIG. 3 is a block diagram for explaining the principle of the present invention. As shown in FIG. 3, the present invention basically comprises an analyzer or analyzing section 11 for analyzing an inputted speech and extracting its feature vectors i.e. feature vectors, a dictionary 12 for preliminary storage of a plurality of words, a matching score calculator or calculating section 13 for collating an analysis result of the analyzer 11 with the feature vectors i.e. feature vectors of each word stored in the dictionary 12 and calculating a score for "similarity", a recognition candidate determiner or determining section 14 for determining and outputting the predetermined number of highest similarity words, an SN ratio calculator or calculating section 15 for calculating an SN ratio of inputted speech to environmental noise, and a number-of-candidates controller or controlling section 16 for controlling the number of candidates determined by the recognition candidate determiner 14 according to a value of an SN ratio calculated by the SN ratio calculator 15.

With the above described configuration, an inputted speech signal is analyzed by the analyzer 11, the analysis result and the feature vectors of each word stored in the dictionary 12 are matched by the matching score calculator 13, and a score is obtained for "similarity".

The SN ratio calculator 15 calculates an SN ratio of an inputted speech signal to environmental noise, and sends the calculation result to the number-of-candidates controller 16. The number-of-candidates controller 16 outputs to the recognition candidate determiner a number-of-candidates control signal assigned according to the value of a calculated SN ratio The recognition candidate determiner 14 determines and outputs the number of candidates according to the above described control signal. That is, after the calculation of an SN ratio, the number of word candidates can be varied depending on the value of an SN ratio. For example, a large value of an SN ratio sets the number of candidates to a predetermined value, 10 for example, and a small value of an SN ratio extends the number of candidates, to 20 words for example.

Such control prevents the problem that a word having the first or second priority in similarity at a high SN ratio may be assigned a low priority, for example the 15th, and excluded from the candidates at a low SN ratio due to an undesirable environmental change. That is, a word to be reasonably defined as a candidate can be processed as a word candidate without being excluded from the candidates by extending the range of the number of word candidates to 20 words, for example, thereby improving a recognition rate.

Figure 4:
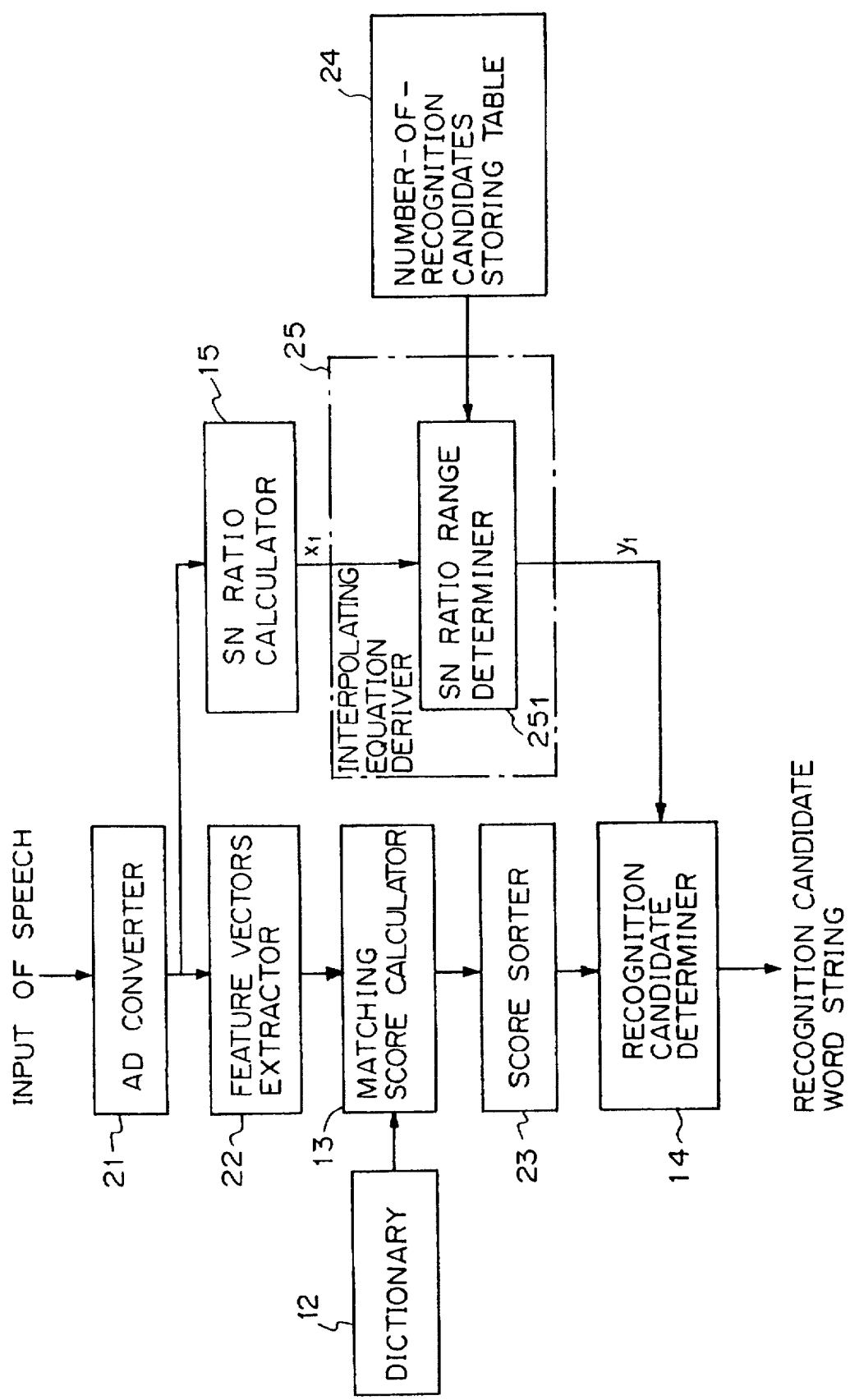
FIG. 4 shows the configuration for explaining the first embodiment of the present invention.

An embodiment of the present invention is explained below by referring to the drawings. FIG. 4 shows the configuration of the first embodiment of the present invention. In FIG. 4, the configuration is generally the same as that shown in FIG. 3 for explaining the principle of the present invention, but further comprises an AD converter 21 for converting an analog signal to a digital signal, a feature vectors extractor or extracting section 22 for analyzing an AD-converted speech signal at predetermined time intervals and outputting feature vectors used in matching them with those of each word stored in the dictionary 12, a score sorter 23 for sorting word candidates relative to the similarity according to the scores calculated by the matching score calculator 13, a number-of-recognition candidates storing table 24 for storing the number of word candidates for obtaining a predetermined recognition rate at an SN ratio calculated by the SN ratio calculator 15, and an interpolating equation deriver 25 for deriving an interpolating equation for obtaining the number of word candidates stored in the number-of-recognition candidates storing table 24.

The AD converter 21 and the feature vectors extractor 22 correspond to the analyzer 11 in FIG. 3. The number-of-recognition candidates storing table 24 and the interpolating equation deriver 25 correspond to the number-of-candidates controller 16 in FIG. 3.

Figure 5:
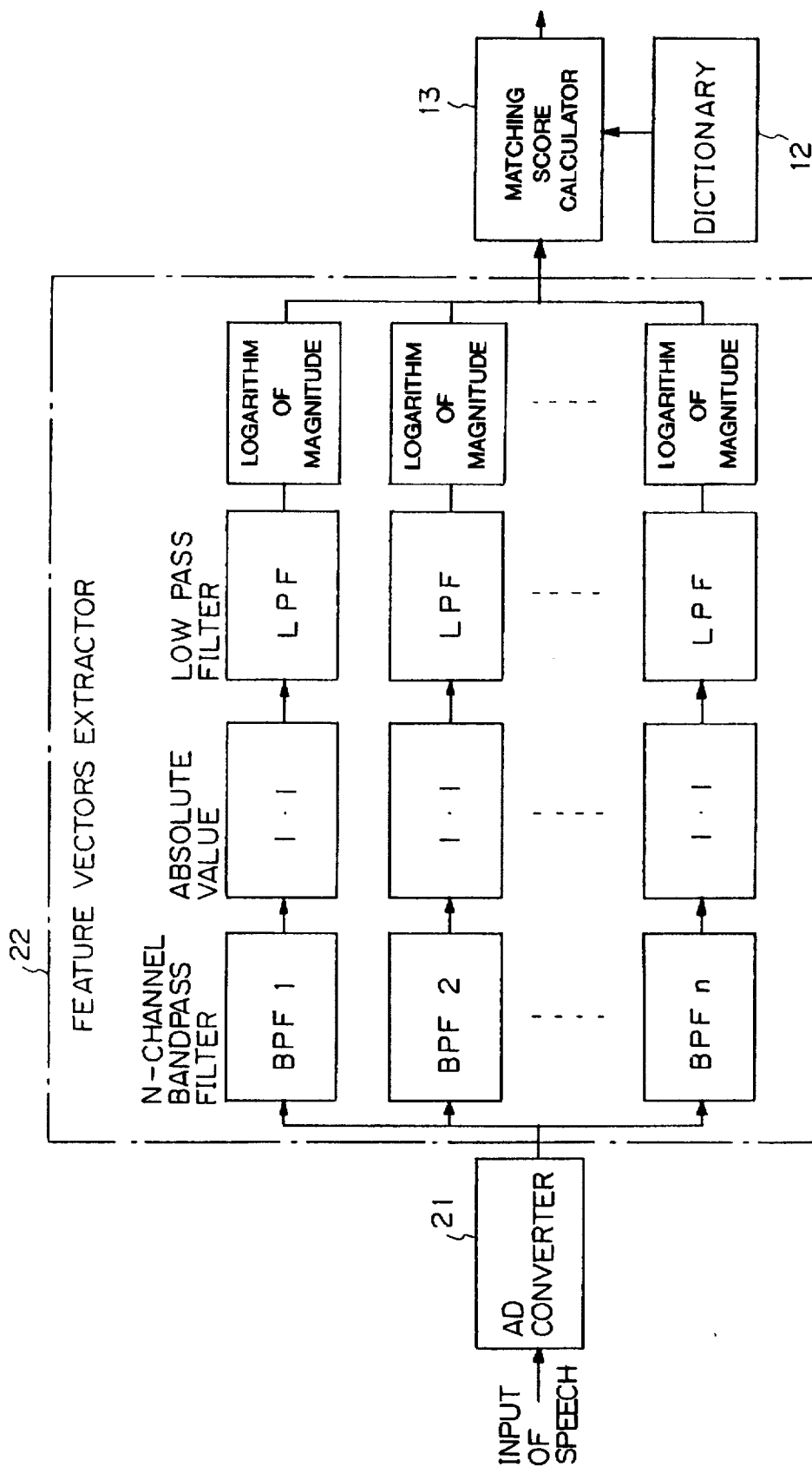
FIG. 5 shows the configuration of the feature vectors extractor.

A technique of analyzing an inputted speech at time intervals by the analyzer 11 is well-known, and can be realized by configuring the feature vectors extractor 22 as shown in FIG. 5. The technique shown in FIG. 5 refers to an analysis using a digital filter bank. That is, a plurality of digital bandpass filters BPF1–BPF N each having a different center frequency are provided in the speech frequency band to be analyzed. Then, a rectifying and smoothing component in the output of each bandpass filter is sampled every few milliseconds or every tens of milliseconds, and expressed in logarithm as a feature vectors parameter. The result is outputted to the score calculator 13 to be compared in similarity with words stored in the dictionary 12. An input speech can also be analyzed by using an analog bandpass filter bank, LPC (Linear Prediction) analysis, cepstrum analysis or FFT (Fast Fourier Transform) analysis.

Figure 6:
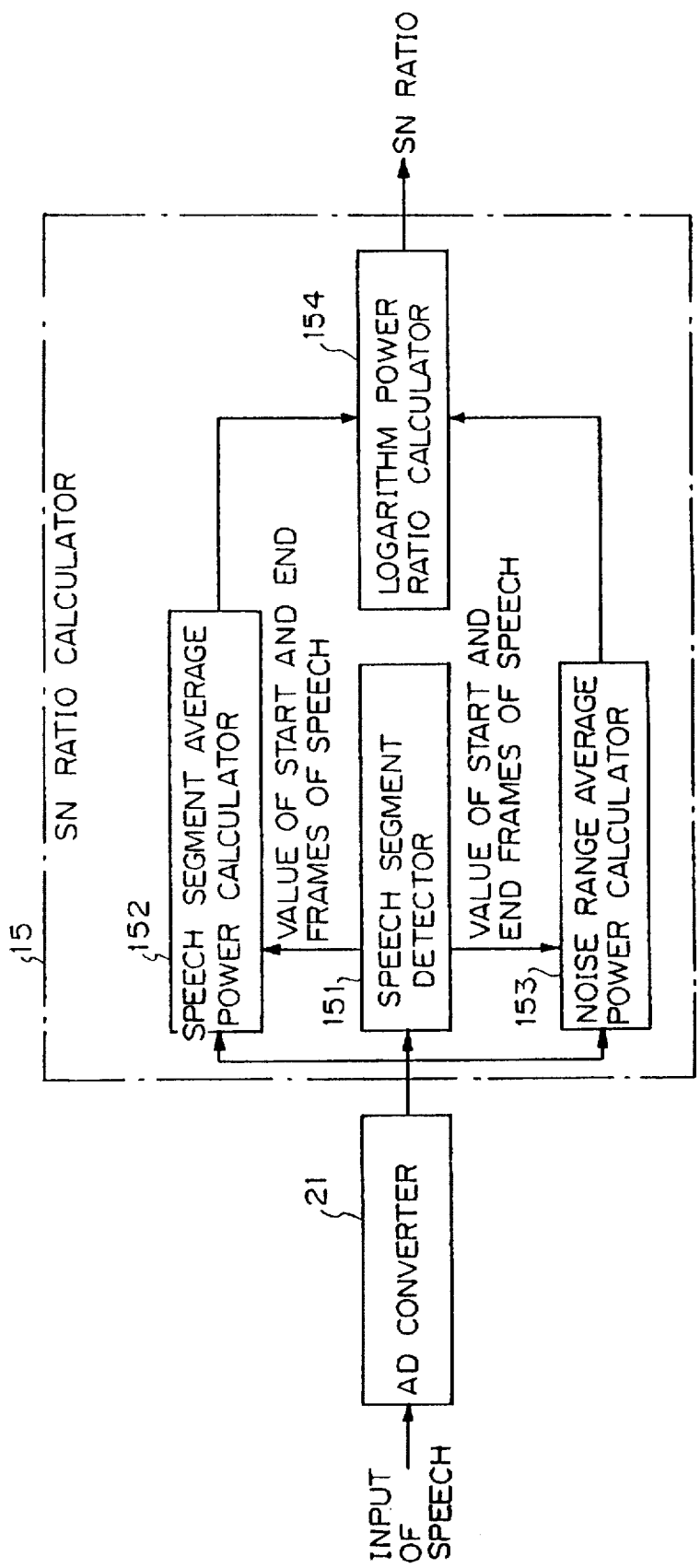
FIG. 6 shows the configuration of the SN ratio calculator.

As shown in FIG. 6, the SN ratio calculator 15 comprises a speech segment detector or detecting section 151, a speech segment average power calculator or calculating section 152, a noise range average power calculator or calculating section 153, and a logarithmic power ratio calculator or calculating section 154. On receiving at the speech segment detector 151 an inputted speech signal which is converted to the digital speech signal by the AD converter 21, the SN ratio calculator 15 calculates at the speech segment average power calculator 152 a speech segment average power according to a signal from the speech segment detector 151, and calculates a noise range average power at the noise range average power calculator 153. Then, it calculates at the logarithmic power ratio calculator 154 a logarithmic power ratio from the speech segment average power and the noise range average power, and then outputs the result as an SN ratio.

Figure 7:
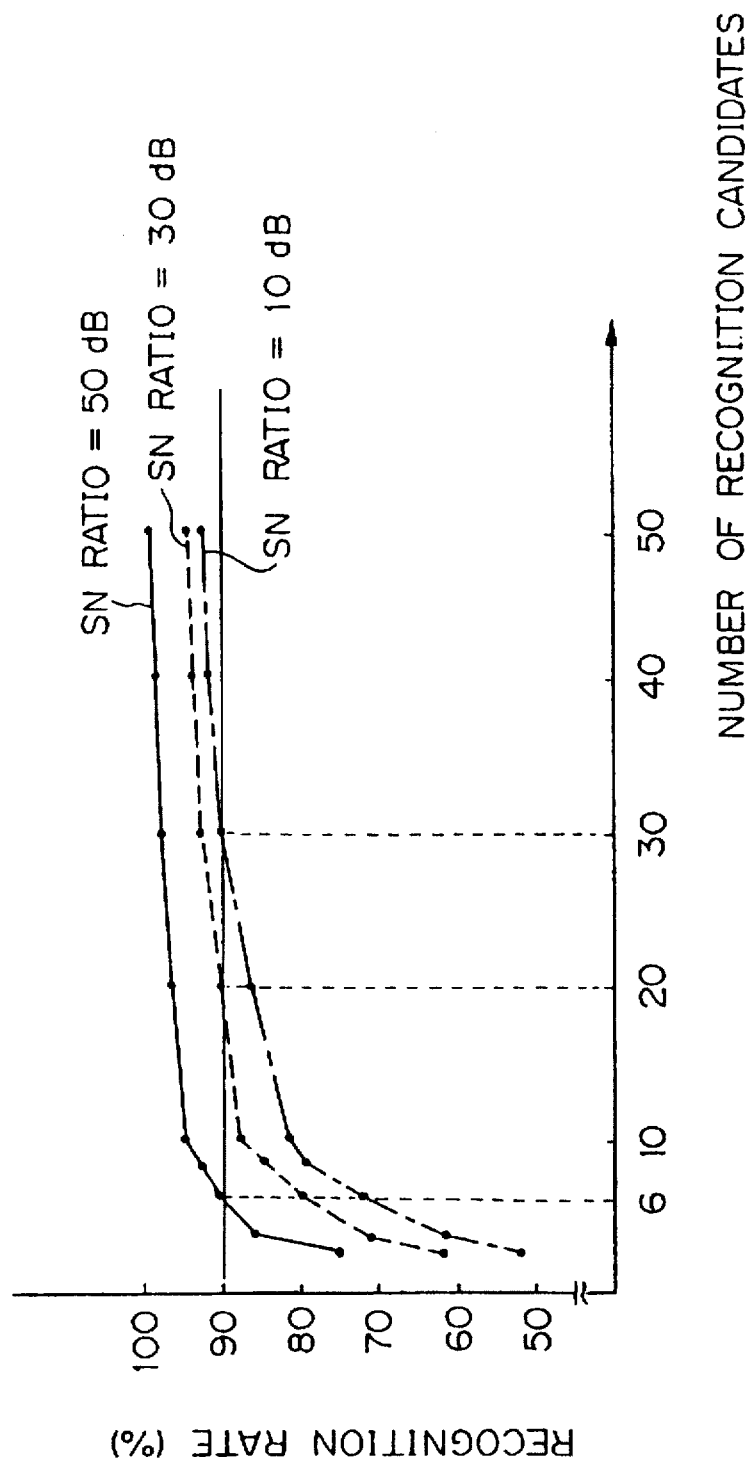
FIG. 7 shows the relationship between each SN ratio for the recognition rate of 90% and the number of candidates to be recognized.

FIG. 7 is a graph showing the change in the recognition rate for the number of word candidates at SN ratios of 50 dB, 30 dB, and 10 dB. As shown in FIG. 7 and as described above, the smaller value an SN ratio indicates, the lower the recognition rate becomes if the number of word candidates is 10. For example, 50 dB (solid line in FIG. 7) yields the recognition rate of 95%, 30 dB (broken line in FIG. 7) yields that of 88%, and 10 dB (dashed line in FIG. 7) yields that of 82%. Whatever value an SN ratio may indicate, the number of word candidates must be 6 at 50 dB, 20 at 30 dB, and 30 at 10 dB to obtain the recognition rate over 90% according to FIG. 7. Thus, the threshold of an SN ratio is set to 50 dB, 30 dB, and 10 dB, and the necessary number of word candidates are set to 6, 20, and 30 respectively. The recognition rate represents a possibility that the right candidates is included in a group of the word candidates. The above described values of the threshold of an SN ratio are interpolated by the interpolating equation provided by the interpolating equation deriver 25, and the appropriate number of word candidates corresponding to the SN ratio of an inputted speech can be determined by the number-of-recognition candidates determiner 26 according to the above described interpolating equation. Then, the determined number of words is given to the recognition candidate determiner 14 to output the determined number of words as a recognition candidate word string starting from the first priority in similarity.

The total operation performed with the configuration above is explained below. First, inputted speech is converted to the digital speech signal by the AD converter 21, and analyzed at appropriate time intervals by the feature vectors extractor 22. Then, the score calculator 13 matches the feature vectors of a word stored in the dictionary 12 with the above described analysis result, and the score sorter 23 sorts word candidates in the order of high similarity and transmits them to the recognition word candidate determiner 14.

Assume that an SN ratio of an inputted speech signal calculated by the SN ratio calculator 15 is 20 dB.

Figure 8:
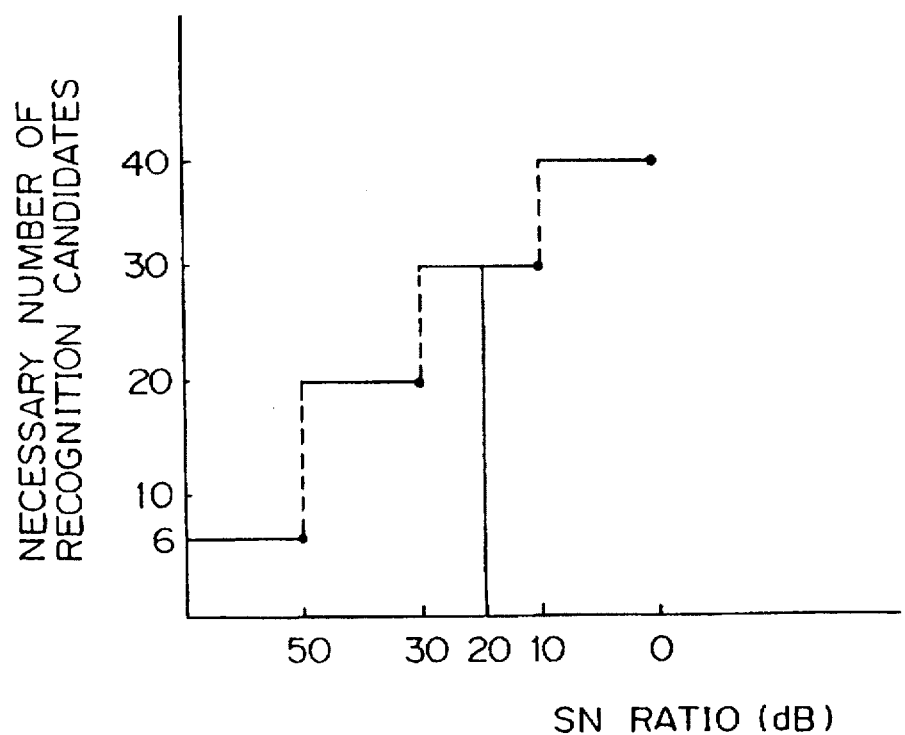
FIG. 8 is a graph for explaining the necessary recognition candidate determiner according to the first embodiment.

To obtain the recognition rate over 90%, the threshold of an SN ratio is set to 50 dB, 30 dB, and 10 dB, and the necessary number of word candidates is set to 6, 20, and 30 respectively. The first embodiment, as shown in FIG. 8, is an example of interpolating the values of the SN ratios of 50 dB, 30 dB, and 10 dB with a predetermined number of word candidates. FIG. 8 shows the number of word candidates for the SN ratios of 50 dB, 30 dB, and 10 dB to obtain the recognition rate over 90%. When the necessary numbers of recognition candidates for the SN ratios of 50 dB, 30 dB, and 10 dB are calculated, the necessary number of recognition candidates between the specified SN ratios is determined to be constant as the number at the lower ratio, thereby generating a graph indicating step changes in the number of word candidates.

For example, if the SN ratio of inputted speech is obtained as 20 dB by the SN ratio calculator 15, it is between 10 db and 30 dB and the number of word candidates is determined to be assigned 30. Thus, when the necessary number of candidates at the SN ratio of 20 dB is determined, the recognition candidate determiner 14 outputs the determined number of words as a recognition candidate word string.

To realize this, the interpolation equation deriver 25 is operated as follows in the first embodiment. The interpolating equation deriver 25 comprises an SN ratio range determiner 251 for determining to what ranges an SN ratio calculated by the SN ratio calculator 15 belongs in the ranges of the above described thresholds 50 dB, 30 dB, and 10 dB. For example, as described above, if an SN ratio calculated by the SN ratio calculator 15 is 20 dB, the SN ratio range determiner 251 determines the SN range to be between 30 dB and 10 dB. When the range of the SN ratio is determined, the corresponding number of recognition candidates (30 in this case) is read, and the data are transmitted to the recognition candidate determiner 14. The interpolating equation in the first embodiment is represented as y=e (where y indicates the number of recognition candidates; e indicates the range of the SN ratio). Therefore, if the SN ratio calculated by the SN ratio calculator 15 is $x_1$, e (the range of the SN ratio) is determined to be the range of the SN ratio $x_1$, and the number of recognition candidates $y_1$ can be determined immediately.

Thus, a recognition rate over a predetermined value (90% in this case) can be obtained at each of the SN ratios of inputted speech data by defining the number of word candidates at an SN ratio between predetermined points of SN ratios as indicating a fixed number of word candidates and changing in the form of steps as shown in FIG. 8. In this case, the number of word candidates stored in the number-of-candidates storing table 24 increases in the form of steps, and the predetermined value points of SN ratios, for example 6, 20, and 30 are also change points. Therefore, the number of word candidates can be determined only by comparing the value of an SN ratio of an inputted speech with a predetermined threshold, thereby removing an operation of obtaining a complicated interpolating equation by the interpolating equation deriver 25. Furthermore, since it is not necessary to determine the number of word candidates corresponding to each of the SN ratios for inputted speech, the system does not require a large memory capacity at all.

Next, the second embodiment is explained below by referring to FIGS. 9 and 10. As shown in FIG. 10, each of the points indicating the numbers of necessary word candidates 6, 20, and 30 at SN ratios of an inputted speech 50 dB, 30 dB, and 10 dB respectively are connected by lines to make a polygonal line graph and interpolate the values by a non-linear function.

In this case, as described above by referring to the data of the number-of-recognition candidates storing table 24, the interpolating equation 25 derives an interpolating equation for interpolating values obtained by connecting predetermined points of the number of word candidates 6, 20, and 30 corresponding to the SN ratios 50 dB, 30 dB, and 10 dB respectively to obtain a graph represented by a line polygonal at each of the points as shown in FIG. 10.

Figure 9:
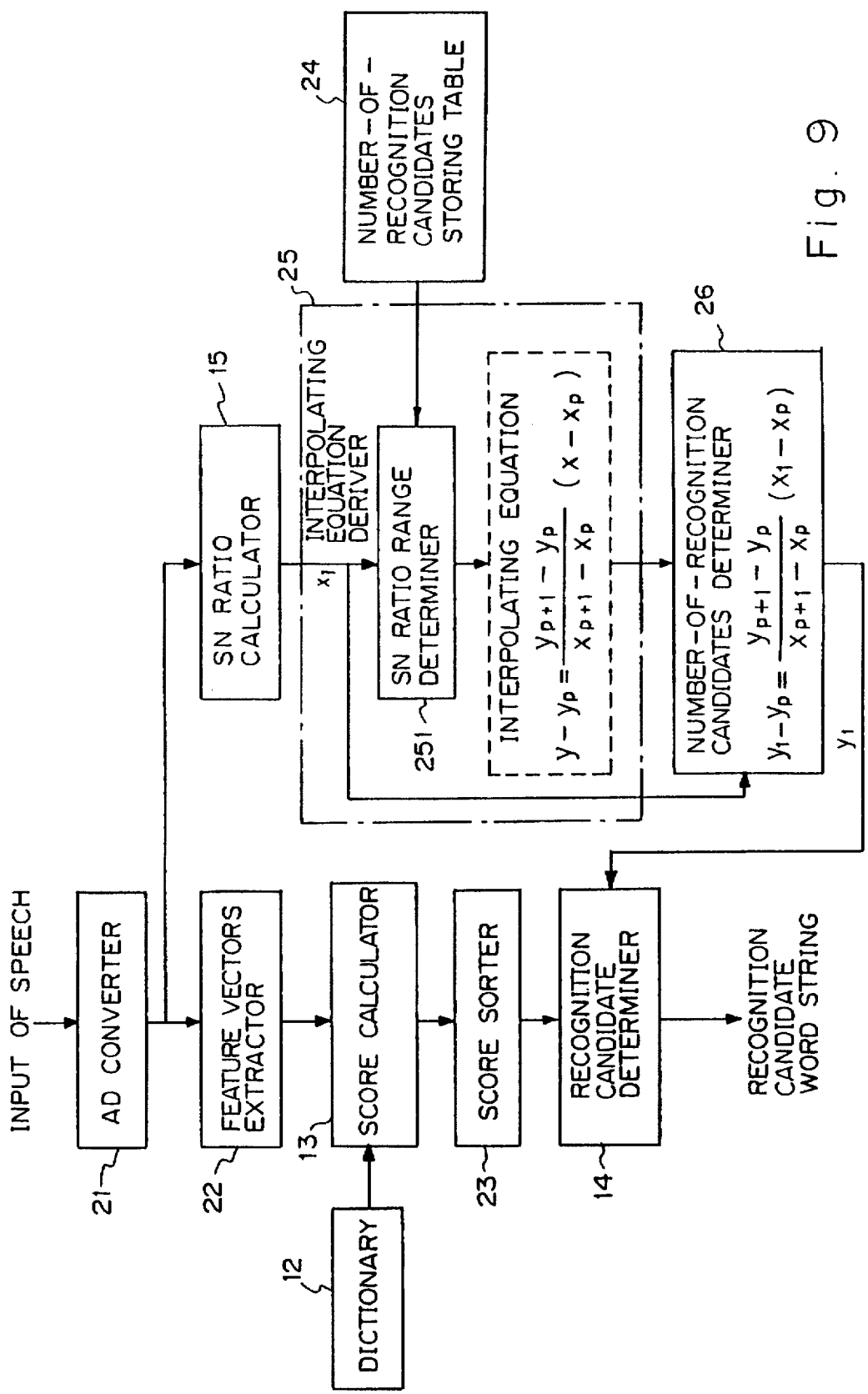
FIG. 9 shows the configuration for explaining the second embodiment.
Figure 10:
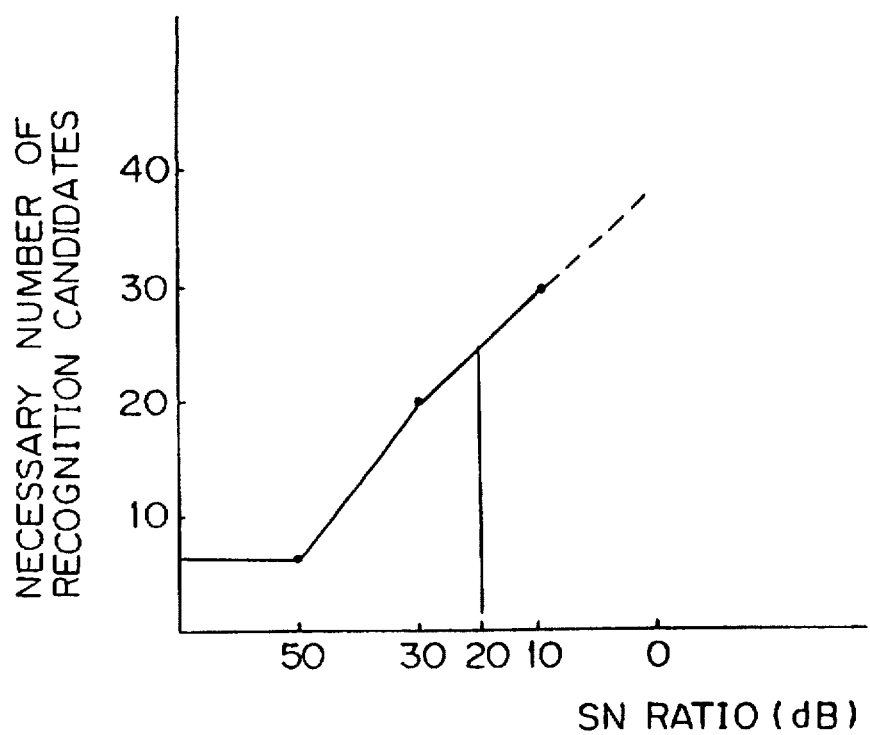
FIG. 10 is a graph for explaining the necessary recognition candidate determiner according to the second embodiment.

To realize this, in the second embodiment, the SN ratio range determiner 251 in the interpolating deriver 25 shown in FIG. 9, determines where an SN ratio obtained by the SN ratio calculator 15 is located in the threshold range 50 dB-30 dB-10 dB of an SN ratio, and it obtains an interpolating equation to interpolate values as indicated by a polygonal line connecting each of the points. The system also comprises a number-of-recognition candidates determiner 26 for calculating the number of recognition candidates by substituting the value of an SN ratio for the interpolating equation. The interpolating equation in the second embodiment can be represented as follows.

$$y - y_p = \frac{y_{p+1} - y_p}{x_{p+1} - x_p} (x - x_p) \qquad (1)$$

where $x_p$: a threshold of an SN ratio $x_{p+1}$: a threshold of an SN ratio of the value following $x_p$ $y_p$: the number of recognition candidates for $x_p$ $y_{p+1}$: the number of recognition candidates for $x_{p+1}$ x: an SN ratio obtained by the SN ratio calculator 15 y: the number of recognition candidates to be obtained

The necessary number of recognition candidates at the SN ratio of $x_1$ can be calculated by substituting for x in the above equation (1) the SN ratio $x_1$ calculated by the SN ratio calculator 15. If the necessary number of recognition candidates is $y_1$, the above described equation (1) can be represented as follows.

$$y_1 - y_p = \frac{y_{p+1} - y_p}{x_{p+1} - x_p} (x_1 - x_p) \quad (2)$$

Equation (2) calculates the number of recognition candidates determined by the number-of-recognition candidates determiner 26 for determining the necessary number of recognition candidates at a specific SN ratio. That is, if an SN ratio is determined to be 20 dB, the "20 dB" is substituted for $x_1$ in equation (2). Then, the necessary number of recognition candidates $y_1$ at the SN ratio can be calculated. In this case, 20 dB is located in the SN ratio range between 30 dB and 10 dB. Therefore, 30 dB is substituted for $x_{p+1}$, 10 dB is substituted for $x_p$, the number of recognition candidates 30 is substituted for $y_{p+1}$, and 20 is substituted for $y_p$ in equation (2). This yields the result $y_1=25$. Accordingly, when an SN ratio is 20 dB, the necessary number of recognition candidates is 25. If the value of $y_1$ is provided for the recognition candidates determiner 14, the recognition candidate determiner 14 outputs 25 higher order words among the word candidates sorted by the sorter 23 as a recognition candidate word string. If the 25 higher order words are determined to be word candidates, the recognition rate of 90% can be guaranteed.

Thus, since the necessary number of word candidates is varied in proportion to the change in the value of an SN ratio of inputted speech in the second embodiment, the number of word candidates corresponding to the value of the SN ratio can be obtained, thereby improving the efficiency in a recognizing operation.

Figure 11:
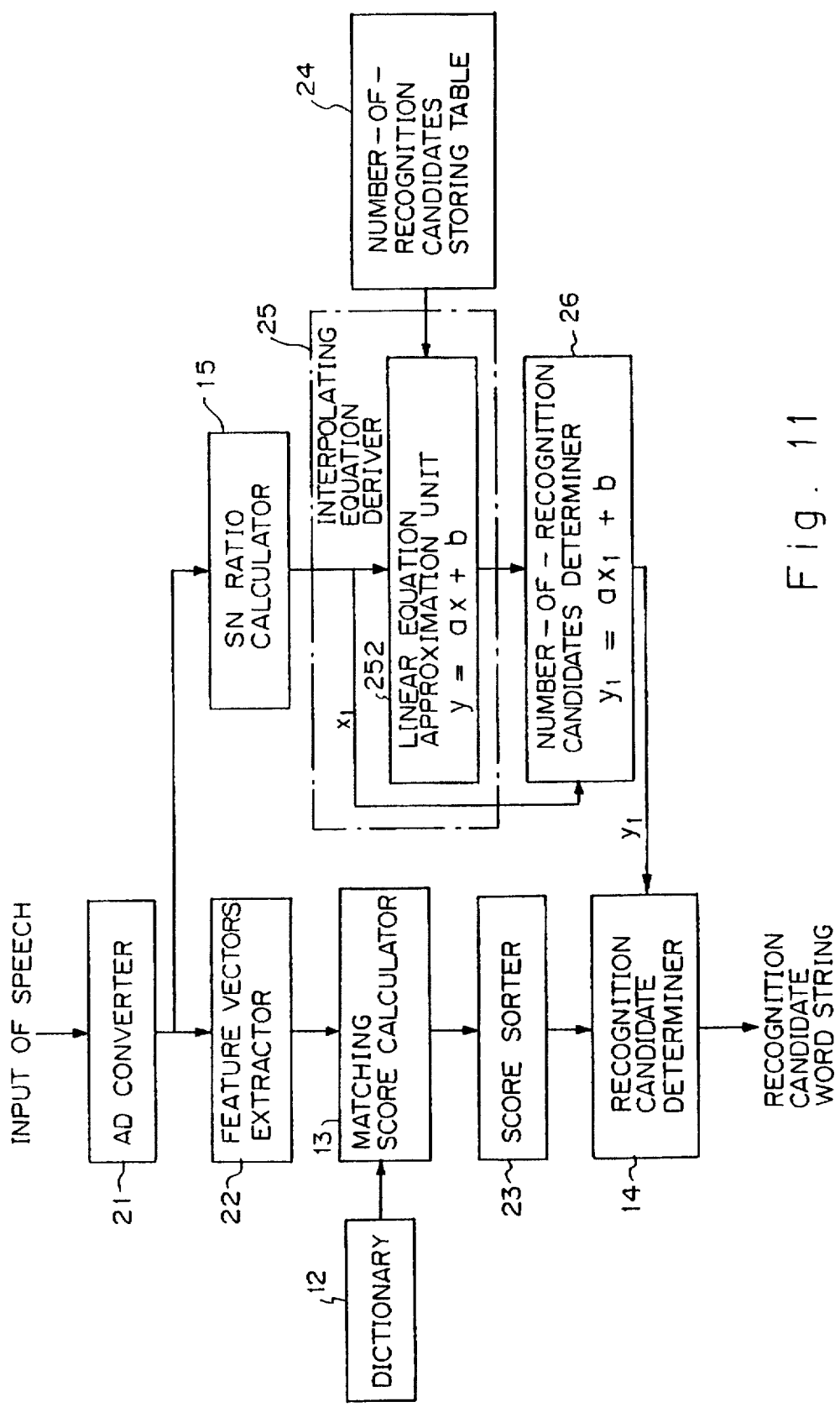
FIG. 11 shows the configuration for explaining the third embodiment.
Figure 12:
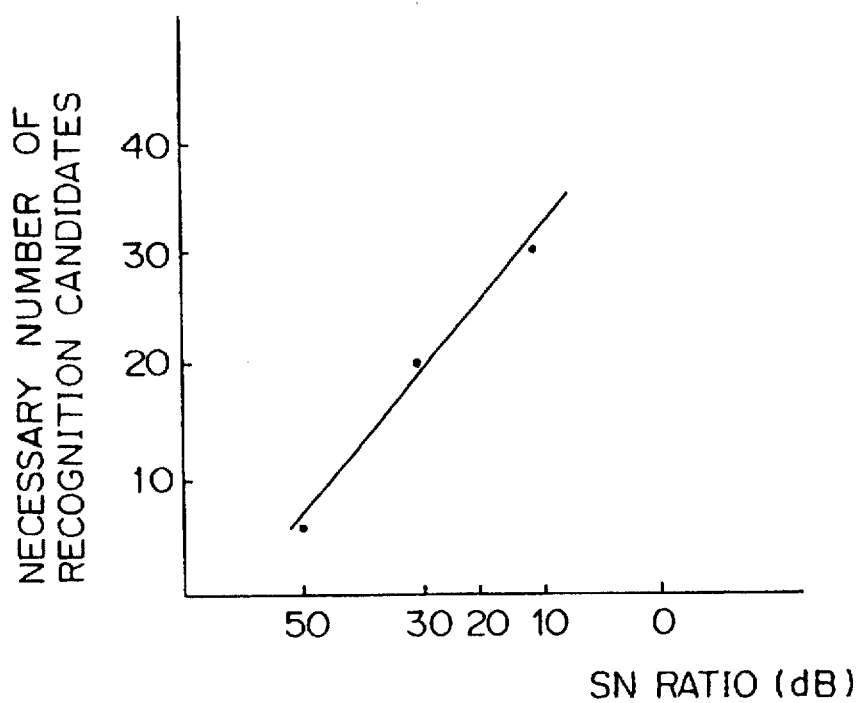
FIG. 12 is a graph for explaining the necessary recognition candidate determiner according to the third embodiment.

Next, the third embodiment is explained by referring to FIGS. 11 and 12. In the third embodiment, each of the points indicating the necessary numbers of word candidates 6, 20, and 30 corresponding to the SN ratios of inputted speech 50 dB, 30 dB, and 10 dB respectively are connected by a straight line, as shown in FIG. 12, indicating an approximate value of each point and interpolating values in each SN ratio range by a straight linear function.

In this case, the interpolating equation deriver 25 uses the data in the number-of-word-candidates storing table 24, makes a linear repression analysis on the data of the value of an SN ratio and the corresponding necessary word candidates, interpolates values between predetermined points using a linear function, and gradually changes the number of word candidates such that each of the points indicating the necessary number of word candidates 6, 20, and 30 corresponding to the SN ratios 50 dB, 30 dB, and 10 dB respectively is connected to adjacent points by a straight line, after adjusting each position a little to make a straight line graph. That is, in the third embodiment, the interpolating equation derived by the interpolating equation deriver 25 is represented as follows.

$$y=ax+b \quad (3)$$

where a and b are coefficients.

A linear equation approximation unit 252 obtains a and b, the coefficients in the linear equation y=ax+b, using the values of SN ratios and the number of candidates read from the number-of-recognition candidates storing table 24, that is, the relationship between the thresholds 50 dB, 30 dB, and 10 dB and the corresponding numbers of recognition candidates 6, 20, and 30 according to the linear regression analysis based on the conventional method of least squares. If the coefficients a and b are obtained, the corresponding SN ratio of $x_1$ is substituted for x. Thus, as in the above described second embodiment, the number-of-recognition candidates determiner 26 determines the necessary number of recognition candidates $y_1$. In this case, $y_1 \approx 25$ if $x_1=20$ dB.

If the value of an SN ratio of inputted speech calculated by the SN ratio calculator 15 is 20 dB, for example, the necessary number of word candidates is determined to be about 25 as in the above described second embodiment, and the recognized word candidate determiner 14 outputs 25 highest order word candidates as a recognition candidate word string. If the 25 highest order word candidates are prepared, the recognition rate of 90% can be guaranteed.

As described above, in the third embodiment, the total area of the value of an SN ratio outputted by the SN ratio calculator 15 is interpolated by a straight line represented by y=ax+b. Therefore, the necessary number of arithmetic operations can be considerably reduced. Besides, as in the above described second embodiment, the necessary number of word candidates is varied in proportion to the change in the value of an SN ratio of an inputted speech. Therefore, the necessary number of word candidates can be obtained corresponding to the obtained value of the SN ratio, thereby improving the efficiency of a recognizing operation.

Although the linear equation y=ax+b is used as an example in the third embodiment, the equation can be replaced with a high degree function such as $y=a_n x^n + a_{n-1} x^{n-1} + \cdots + a_1 x + b$ to obtain coefficients $a_n, a_{n-1}, \cdots, a_1, b$ according to the multiple regression analysis based on the above described method of least squares. (However, in this case, the value of n is limited by the range of data stored in the number-of-recognition candidates storing table 24.)

Although a word is recognized in each of the above described embodiments, other objects such as syllable, phrase and sentence can be processed as objects to be recognized.

When a phrase or a sentence (during conversation) is considered as an application of the objects to be recognized, the following sentence, for example, is to be recognized.

"Watashiwa Gakkoe Ikimasu"

( I go to school)

When the recognition is performed in units of phrase, the following candidates are considered for respective phrases.

1. Watashiwo Gakkowa Ikimasu
2. Watashini Gakkoe Itta
3. Watashiwa Gakkono Ikimashita As shown above, the candidates are provided for respective phrases. This is performed based on a completely vocal process. Therefore, the phrase recognition or the sentence recognition can pick up a candidate which is always not ranked at a highest position, by using a syntax or semantics analysis. If a certain phrase is excluded from a candidate, it is very difficult to restore the excluded candidate at the stage of performing the syntax or semantics analysis.

On the other hand, as described above, the right candidate tends to be excluded from a group of candidates when the SN ratio decreases, and if the number of candidates are constant. Therefore, the present invention is advantageous in that the right candidate is prevented from being excluded from a group of the candidates by changing the number of the candidates based on the SN ratio.

As described above, the present invention removes the problem that a word to be reasonably selected as a recognition candidate may be excluded from the candidates due to an undesirable change in an SN ratio caused by an environmental change by changing the necessary number of word candidates in proportion to the value of an SN ratio, that is, a ratio of inputted speech to the environmental noise to guarantee a predetermined recognition rate. Thus, words can be recognized at a high speed, thereby improving the efficiency in a recognizing operation.

What is claimed is:

1. A number-of-recognition candidates determining system in a speech recognition device for calculating a similarity between a plurality of preliminarily registered speech words and an inputted speech word and outputting as recognition candidates a determined number of said plurality of preliminarily registered speech words having a higher order of similarity between said inputted speech word and said plurality of preliminarily registered speech words, comprising:

speech recognition means for comparing said inputted speech word with said plurality of preliminarily registered speech words, for prioritizing said plurality of preliminarily registered speech words in an order from highest to lowest in similarity to said inputted speech word, and for outputting said plurality of preliminarily registered speech words in said order;

SN ratio calculator means for calculating an SN ratio of said inputted speech word to environmental noise;

number-of-recognition candidates controller means for determining a quantity of said outputted plurality of preliminarily registered speech words in said order based on said calculated SN ratio; and recognition candidate determiner means for outputting said quantity of said plurality of preliminarily registered speech words in said order from highest to lowest in similarity as said recognition candidates.

2. The number-of-recognition candidates determining system according to claim 1, wherein said number-of-recognition candidates controller means comprises:

interpolating means for selecting a plurality of SN ratios each corresponding to a number of said recognition candidates to obtain a predetermined recognition rate and for interpolating a number of said recognition candidates for said calculated SN ratio being between said selected SN ratios, thereby determining said number having said highest priority based on said calculated SN ratio; and number-of-recognition candidates storing table means for storing said number of recognition candidates corresponding to each of said selected SN ratios.

3. A number-of-recognition candidates determining system in a speech recognition device for calculating a similarity between a plurality of preliminarily registered speech words and an inputted speech word and outputting as recognition candidates a determined number of said plurality of preliminarily registered speech words having a higher order of similarity between said inputted speech word and said plurality of preliminarily registered speech words, comprising:

speech recognition means for comparing said inputted speech word with said plurality of preliminarily registered speech words, for prioritizing said plurality of preliminarily registered speech words in an order from highest to lowest in similarity to said inputted speech word, and for outputting said plurality of preliminarily registered speech words in said order;

SN ratio calculator means for calculating an SN ratio of said inputted speech word to environmental noise;

interpolating means for selecting a plurality of SN ratios each corresponding to a number of said recognition candidates to obtain a predetermined recognition rate and for interpolating a number of said recognition candidates corresponding to said calculated SN ratio, said calculated SN ratio being between said selected SN ratios;

number-of-recognition candidates storing table means for storing said number of recognition candidates corresponding to each of said selected SN ratios; and means for determining a quantity of recognition candidates based on said SN ratio calculated by said SN ratio calculator means and said number of recognition candidates stored in said number-of-recognition candidates storing table means, such that said quantity of recognition candidates is fixed as a constant value corresponding to said calculated SN ratio being between said selected SN ratios, and for outputting said quantity of recognition candidates of said outputted preliminarily registered speech words in said order from highest to lowest in similarity as said recognition candidates.

4. The number-of-recognition candidates determining system according to claim 3, wherein said determined number for said SN ratio between said selected SN ratios corresponds to the selected number of recognition candidates corresponding to the smaller value of said selected SN ratios.

5. A number-of-recognition candidates determining system in a speech recognition device for calculating a similarity between a plurality of preliminarily registered speech words and an inputted speech word and outputting as recognition candidates a determined number of said plurality of preliminarily registered speech words having a higher order of similarity between said inputted speech word and said plurality of preliminarily registered speech words, comprising:

speech recognition means for comparing said inputted speech word with said plurality of preliminarily registered speech words, for prioritizing said plurality of preliminarily registered speech words in an order from highest to lowest in similarity to said inputted speech word, and for outputting said plurality of preliminarily registered speech words in said order;

SN ratio calculator means for calculating an SN ratio of said inputted speech word to environmental noise;

interpolating means for selecting a plurality of SN ratios each corresponding to a number of said recognition candidates to obtain a predetermined recognition rate and for deriving an interpolating equation for interpolating a number of said recognition candidates corresponding to said calculated SN ratio being between said selected SN ratios;

number-of-recognition candidates storing table means for storing said number of recognition candidates corresponding to each of said selected SN ratios; and number-of-recognition candidates determiner means for determining a quantity of recognition candidates based on said interpolated number by substituting said SN ratio calculated by said SN ratio calculator means in said interpolating equation, and for outputting said quantity of recognition candidates of said outputted preliminarily registered speech words in said order highest to lowest in similarity as said recognition candidates, said interpolating equation being obtained such that said determined number is gradually varied in each SN ratio range between said selected SN ratios.

said interpolating equation thereby determining said determined number for any SN ratio.

6. The number-of-recognition candidates determining system in a speech recognition device according to claim 5, wherein said interpolating equation generates a linear change in a graph indicating the change in said determined number for each SN ratio between said selected SN ratios.

7. A number-of-recognition candidates determining system in a speech recognition device for calculating a similarity between a plurality of preliminarily registered speech words and an inputted speech word and outputting as recognition candidates a determined number of said plurality of preliminarily registered speech words having a higher order of similarity between said inputted speech word and said plurality of preliminarily registered speech words, comprising:

speech recognition means for comparing said inputted speech word with said plurality of preliminarily registered speech words, for prioritizing said plurality of preliminarily registered speech words in an order from highest to lowest in similarity to said inputted speech word, and for outputting said plurality of preliminarily registered speech words in said order;

SN ratio calculator means for calculating an SN ratio of said inputted speech to environmental noise;

interpolating means for selecting a plurality of SN ratios each corresponding to a number of said recognition candidates to obtain a predetermined recognition rate and for deriving an interpolating equation for interpolating a number of said recognition candidates corresponding to said calculated SN ratio being between said selected SN ratios;

number-of-recognition candidates storing table means for storing said number of recognition candidates corresponding to each of said selected SN ratios; and number-of-recognition candidates determiner means for determining a quantity of recognition candidates based on said interpolated number by substituting said SN ratio calculated by said SN ratio calculator means in said interpolating equation, and for outputting said quantity of recognition candidates of said outputted preliminarily registered speech words in said order from highest to lowest in similarity as said recognition candidates, said quantity being determined for any of said selected SN ratios by obtaining said interpolating equation for gradually varying the quantity for each of said SN ratio ranges between said selected SN ratios.

8. The number-of-recognition candidates determining system in a speech recognition device according to claim 7, wherein said interpolating equation for gradually varying said determined number for each of said SN ratio ranges between said selected SN ratios is a linear function equation.

9. The number-of-recognition candidates determining system in a speech recognition device according to claim 7, wherein said interpolating equation for gradually varying said determined number for each of said SN ratio ranges between said selected SN ratios is a high degree function equation including a multiple regression of the high degree function.

* * * * *